United States Patent
Saito et al.

(10) Patent No.: US 6,288,752 B1
(45) Date of Patent: Sep. 11, 2001

(54) VIDEO EQUIPMENT FOR DISPLAYING A PICTURE SCREEN IN AN ARBITRARY SIZE AT AN ARBITRARY POSITION ON A DISPLAY SCREEN

(75) Inventors: Seiji Saito, Kanagawa; Masashi Usui; Yuzo Murayama, both of Tokyo; Hiroaki Nagasawa, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/387,989

(22) Filed: Sep. 1, 1999

(30) Foreign Application Priority Data

Sep. 3, 1998 (JP) .................................................. 10-249881

(51) Int. Cl.[7] ............................. H04N 9/74; H04N 3/223
(52) U.S. Cl. ........................................... 348/581; 348/704
(58) Field of Search .................................... 348/581, 565, 348/580, 704, 561

(56) References Cited

U.S. PATENT DOCUMENTS

| | | | |
|---|---|---|---|
| 5,712,689 | * | 1/1998 | Yasuki ................................... 348/581 |
| 5,742,334 | * | 4/1998 | Yagura ................................... 348/581 |
| 5,914,728 | * | 6/1999 | Yamagishi ........................... 348/581 |

* cited by examiner

Primary Examiner—Sherrie Hsia
(74) Attorney, Agent, or Firm—Frommer Lawrence & Haug LLP.; William S. Frommer

(57) ABSTRACT

The present invention is to reduce the change of the position of a picture screen due to the magnification/reduction of the picture screen and occurrence of losing a part of the picture screen. The picture screen signal of a main picture screen is switched to the picture screen signal of a sub or slave picture screen to be described later when the picture screen signal of the main picture screen is supplied to a change-over switch (2) from an input terminal (1). This picture screen signal is supplied to an image receiving tube (4) through an RGB drive circuit (3). The picture screen signal of the slave picture screen is supplied to a slave picture screen signal forming circuit (6) from an input terminal (5), reduced to an arbitrary size, taken out at the timing of an arbitrary position and the picture screen signal of the slave picture screen is formed. Further, a command signal from a command unit is supplied to a microcomputer 9 through an input terminal (8). In the microcomputer (9), if the command signal mentioned above is supplied to a central processing unit (CPU) (10), a display size control signal is formed by a display size change processing unit (11) (software) and at the same time a display position control signal is formed by a display position change processing unit (12) (software).

4 Claims, 5 Drawing Sheets

Display Screen 480×360
H=240
V=180

Picture Screen Before
Magnification
80×60(m=6)

Picture Screen After
Magnification
160×120(n=3)
$O_1$(200,40)
$O_2$(160,32)

Display Screen 480×360
H=240
V=180

Picture Screen Before
Reduction
160×120(m=3)

Picture Screen After
Reduction
80×60(n=6)
$O_1$(48,−112)
$O_2$(60,−140)

Display Screen 480×360
H=240
V=180

Picture Screen Before
Magnification
80×60(m=6)

Picture Screen After
Magnification
160×120(n=3)
$O_1$(40,30)
$O_2$(32,24)

Display Screen 480×360
H=240
V=180

Picture Screen Before
Reduction
160×120(m=3)

Picture Screen After
Reduction
80×60(n=6)
$O_1$(-96,-72)
$O_2$(-120,-90)

VIDEO EQUIPMENT FOR DISPLAYING A PICTURE SCREEN IN AN ARBITRARY SIZE AT AN ARBITRARY POSITION ON A DISPLAY SCREEN

BACKGROUND OF THE INVENTION

1. Field of the Invention

The present invention relates to a video equipment suited to be used to, for example, display a picture screen in an arbitrary size at an arbitrary position on a display screen. More particularly, the present invention is designed to avoid making the display position of a picture screen, when the size of which has been changed, appear unnatural.

2. Description of the Related Art

A reduced-size sub or slave picture screen as well as a main picture screen is displayed on a display screen in a video equipment, such as a television receiver. In the video equipment of this type, a device which allows the size of the slave picture screen to be arbitrarily changed is provided. In case of changing the size of the slave picture screen in this way, the display screen is equally divided by two in the horizontal and vertical directions or into four regions (I) to (IV) totally, as shown in, for example, FIG. 3. The size of the picture screen is changed in accordance with each of these regions.

That is to say, if the center of the slave picture screen is in the upper-left region (I), for example, size change is made centered around the upper-left portion. Likewise, if the center of the slave picture screen is in the upper-right region (II), size change is made centered around the upper-right portion. If the center of the stave picture screen is in the lower-left region (III), size change is made centered around the lower-left portion. Further, if the center of the slave picture screen is in a lower-right region (IV), size change is made centered around the lower-right portion. By doing so, it is possible to make the display position of the picture screen appear unnatural less frequently or to avoid losing the picture screen due to the size change.

In the video equipment of this type, there is further proposed a device capable of arbitrarily changing the display position of a sub or slave picture screen. If a slave picture screen A shown in, for example, FIG. 4 is magnified, the slave picture screen A is magnified to a slave picture screen B since the center of the slave picture screen A is in the region (I). Then, if the size of the slave picture screen B is reduced, a resultant reduced-size picture screen C is as shown in FIG. 4 since the center of the slave picture screen B is in the region (II). In other words, the display position of the slave picture screen changes according to the magnification/reduction of the slave picture screen.

In contrast, there is also proposed a method of magnifying/reducing the size of a slave picture screen with the center of the slave picture screen fixed. In this method, however, if the size of a slave picture screen A shown in, for example, FIG. 5 is magnified, a slave picture screen B is obtained as shown in FIG. 5. If a slave picture screen A' in FIG. 5 is magnified, however, a slave picture screen B' is obtained and a part of the picture screen B' (oblique line portion) is lost as shown in FIG. 5. This loss occurs irrespectively of a user's intent, which might possibly cause various problems in the video equipments.

This application has been made under the above circumstances. Problems to be solved are that if the display position of a picture screen can be arbitrarily changed, the changed display position as a result of magnification/reduction of the picture screen appears unnatural or a part of the picture screen is lost. Thus, various problems possibly occur in the conventional device.

SUMMARY OF THE INVENTION

Considering them, according to the present invention, it is assumed that a picture screen before being subjected to magnification or reduction is a first picture screen and that a picture screen after being subjected to magnification or reduction is a second picture screen. Then, the center of the second picture screen is moved and the second picture screen is magnified or reduced so that the ratio of the distance between the center of the display screen and that of the first picture screen to the distance between the center of the display screen and that of the second picture screen on a line passing the center of the first picture screen and that of the display screen is the same as the ratio of the distance between the center of the display screen and that of the first picture screen to the distance between the center of the display screen and that of the second picture screen when the first and second picture screens are moved to an arbitrary corner on the display screen. By doing so, the change of the display position due to the magnification/reduction of the picture screen is little and it is, therefore, possible to remove the possibility that a part of a picture screen is lost.

That is, the present invention relates to a video equipment magnifying or reducing arbitrarily a first picture screen of a size reduced from a size of a display screen at an arbitrary scale factor and displayed at an arbitrary position and displaying the resultant first picture screen as the second picture screen on the display screen, which is characterized in that the video equipment comprises a means for setting a size of the second picture screen; and a means for setting a display position of the second picture screen, and in that the center of the second picture screen is moved and the second picture screen is magnified or reduced arbitrarily so that the ratio of the distance between the center of the display screen and that of the first picture screen to the distance between the center of the display screen and the second picture screen on a line passing the center of the first picture screen and that of the display screen is the same as the ratio of the distance between the center of the display screen and that of the first picture screen to the distance between the center of the display screen and that of the second picture screen when the first and second picture screens are moved to an arbitrary corner on the display screen.

DETAILED DESCRIPTION OF THE PREFERRED EMBODIMENT

Figure 1:
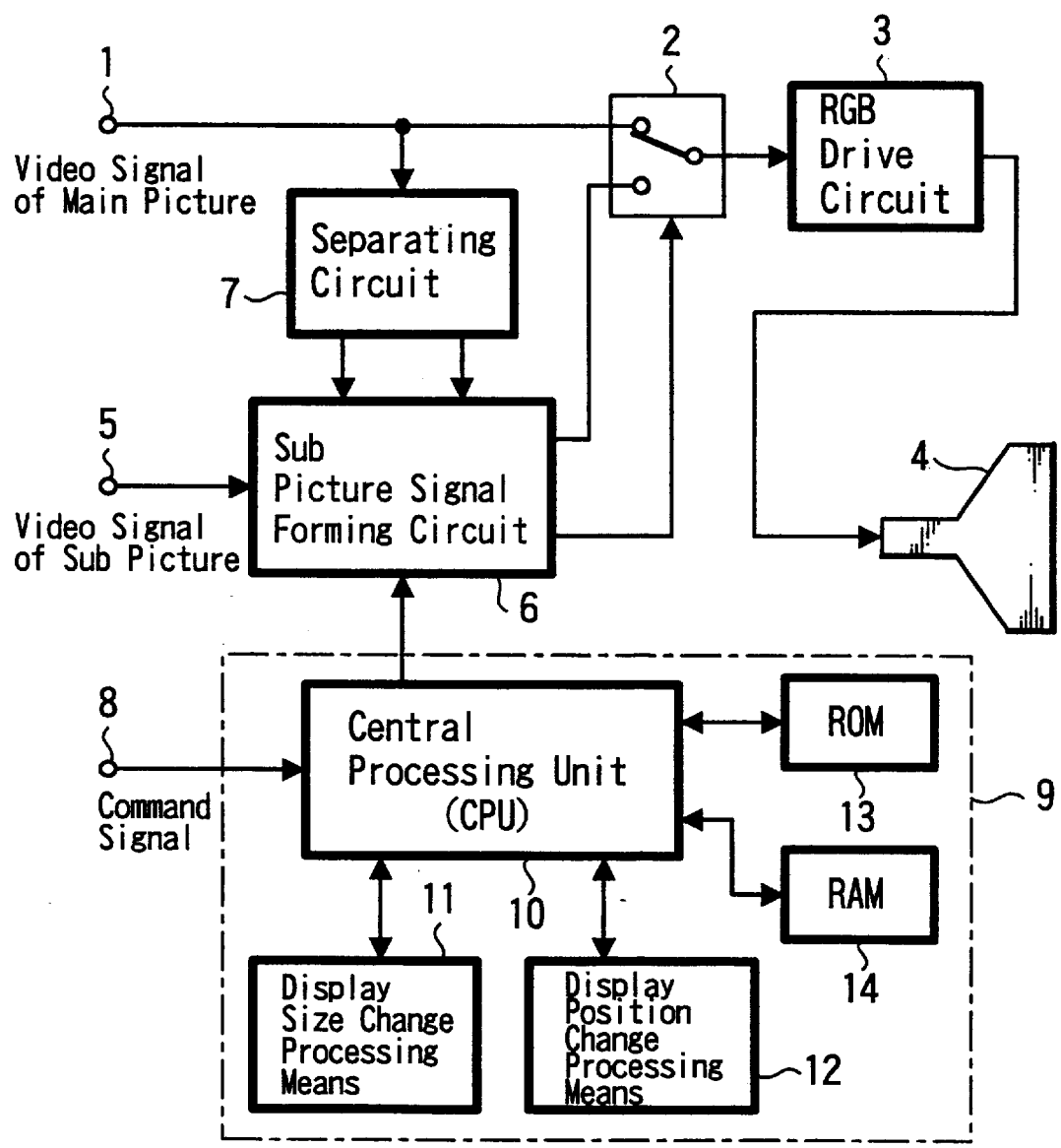
FIG. 1 is a block diagram showing an example of a video equipment to which the present invention is applied.

Now, the present invention will be described with reference to the drawings. FIG. 1 is a block diagram showing the constitution of an example of the video equipment according to the present invention.

In FIG. 1, a video signal of, for example, a main picture screen displayed on a display screen is supplied to an input terminal 1. The video signal of a main picture screen is supplied to a change-over switch 2 by which the video signal is changed to that of a sub or slave picture screen to be described later on. The video signal from the change-over switch 2 is supplied to an image receiving tube 4 on which the display screen is displayed through a RGB drive circuit 3.

The video signal of the slave picture screen is supplied from an input terminal 5 to a sub or slave picture screen signal forming circuit 6. To the forming circuit 6, a synchronizing signal separated from, for example, the video signal of the main picture screen by a separating circuit 7. As a result, the video signal of the slave picture screen is reduced to have an arbitrary size and derived at the timing of an arbitrary position on the display screen, whereby the video signal of the slave picture screen is formed in the forming circuit 6.

Thereafter, the video signal of the slave picture screen thus formed is supplied to the change-over switch 2. Also, a switch signal corresponding to the timing of the arbitrary position on the display screen as described above is formed in the forming circuit 6. By switching the change-over switch 2 in accordance with the switch signal, a slave picture screen of an arbitrary size is synthesized at an arbitrary position on the main picture screen.

Further, a command signal from an arbitrary command means is supplied to a microcomputer 9 through an input terminal 8. In the microcomputer 9, the command signal is supplied to a central processing unit (CPU) 10 to thereby form a control signal for designating the display size, position and the like of the slave picture screen. The control signal is supplied to the slave picture screen signal forming circuit 6 to thereby control the display position and the like of the slave picture screen.

In other words, in the microcomputer 9, the command signal from the input terminal 8 is supplied to the CPU 10, in which a display size control signal is formed by a display size change processing means 11 (software). In addition, a display position control signal is formed by a display position change processing means 12 (software) and supplied to the slave picture screen signal forming circuit 6.

These softwares of the display size change processing means 11, the display position change processing means 12 and the like are stored in, for example, a read-only memory (ROM) 13. A random-access memory (RAM) 14 stores values which are being processed and the like.

In the microcomputer 9, if a comman signal for indicating only the change of the slave picture screen display size is supplied, display size change processing is carried out and, at the same time, display position change processing to be described below are carried out.

Figure 2:
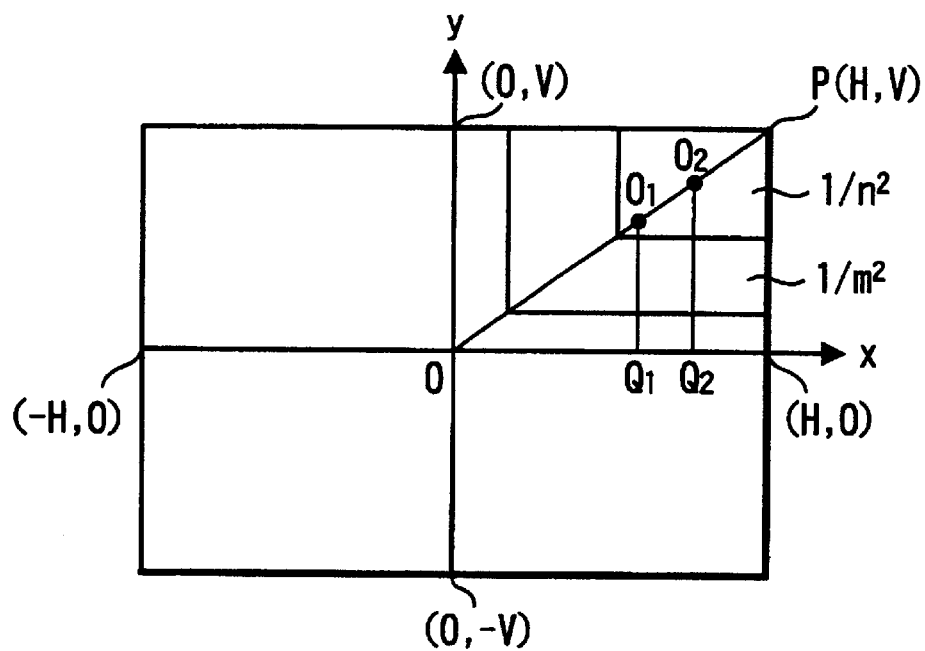
FIG. 2 is a view used for explaining the operation of the video equipment.
Figure 3:
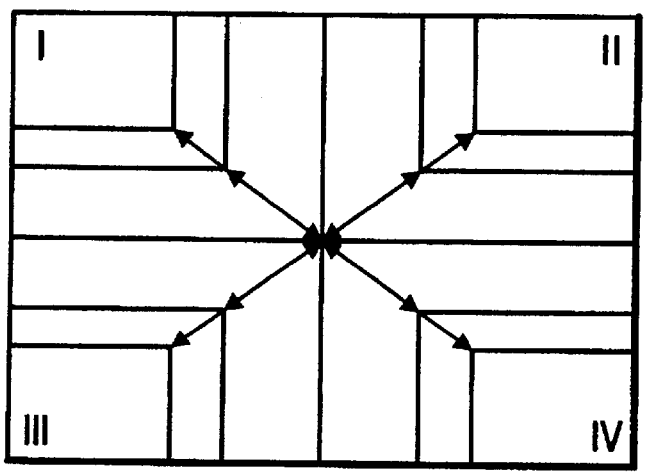
FIG. 3 is a view used for explaining a conventional device.
Figure 4:
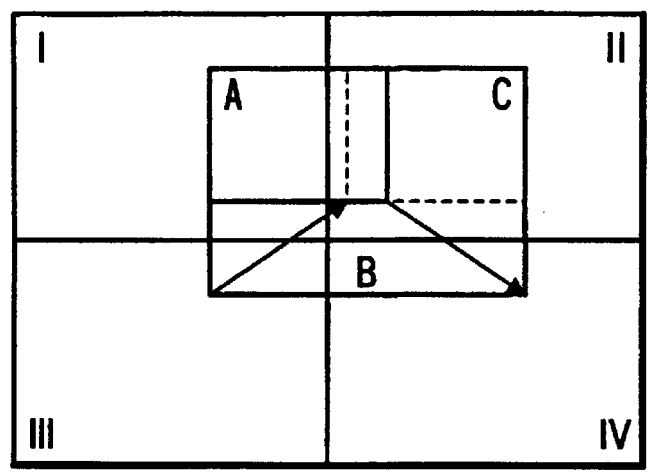
FIG. 4 is a view used for explaining a conventional device.
Figure 5:
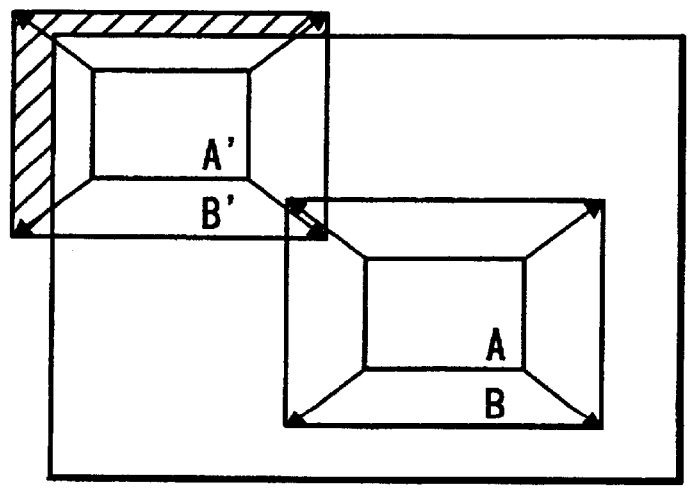
FIG. 5 is a view used for explaining a conventional device.

Namely, FIG. 2 shows the display screen. In this case, only an effective picture screen on, for example, the image receiving tube 4 is considered. While the coordinates of the effective picture screen are set at $-V \sim V$ in the vertical direction and $-H \sim H$ in the horizontal direction with reference to a central point O (0, 0) and a sub or slave picture screen having a center (x, y) is considered.

It is assumed that the size of the slave picture screen is changed from $1/m^2$ time of the display screen to $1/n^2$ time (where $1 < m < n$). If the size change from a $1/m^2$ picture screen to a $1/n^2$ picture screen starts from the upper-right corner, it is possible to determine the display position of the slave picture screen over the entire display screen in a unique manner.

It is then assumed that the center of the $1/m^2$ picture screen is set at $O_1$ $(x_1, y_1)$ and that of the $1/n^2$ picture screen is set at $O_2$ $(x_2, y_2)$. It is possible to change the size of the picture screen within the effective picture screen if the upper-right corner of $1/n^2$ picture screen overlies on a point P (H, V) while the upper-right corner of the $1/m^2$ picture screen overlies on the point P (H, V).

In this case, if it is assumed that points extended vertically on the X axis from the central points O1 and O2 of the picture screens are points $Q_1$ and $Q_2$, respectively, $\triangle OO_1Q_1 \triangle OO_2Q_2$ is satisfied. Therefore, the following formulas are obtained.

$$OQ_1:OQ_2=(H-H/m):(H-H/n)$$

$$O_1Q_1:O_2Q_2=(V-V/m):(V-V/n)$$

From the above formulas, $x_2$ and $y_2$ are obtained as follows:

$$x_2 = (H - H/n)/(H - H/m) * x_1$$
$$= [m*(n-1)]/[n*(m-1)] * x_1$$
$$y_2 = (V - V/n)/(V - V/m) * y_1$$
$$= [m*(n-1)]/[n*(m-1)] * y_1$$

The central point $O_2$ $(x_2, y_2)$ of the $1/n^2$ picture screen can be thereby obtained.

Using the central point $O_2$ $(x_2, y_2)$, a display position control signal is formed by the display position change processing means 12 (software). The display position control signal as well as the display size control signal formed by the display size change processing means 11 (software) is supplied to the slave picture screen signal forming circuit 6 described above. If m>n>1, display size can be magnified in the same manner.

Figure 6:
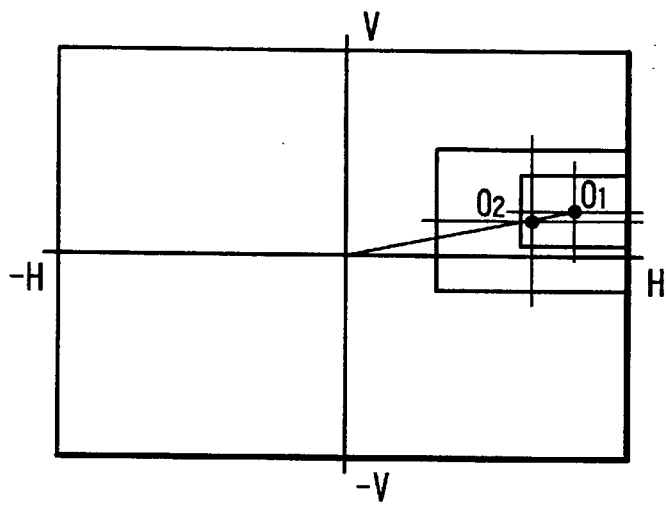
FIG. 6 is a view which shows the operation of a concrete example of the present invention.
Figure 7:
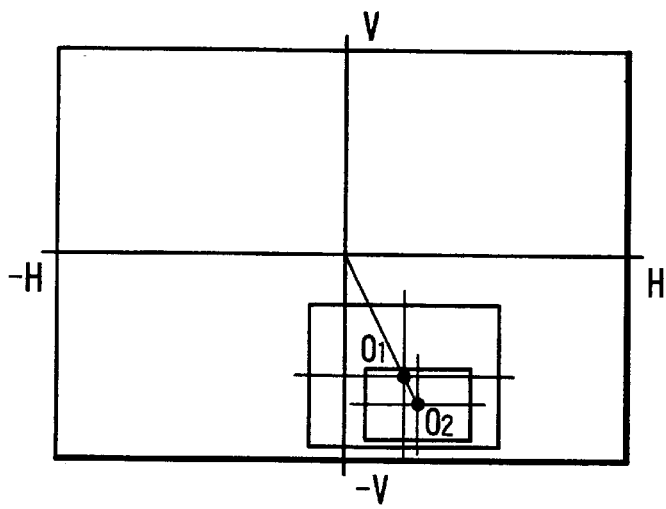
FIG. 7 is a view which shows the operation of a concrete example of the present invention.
Figure 8:
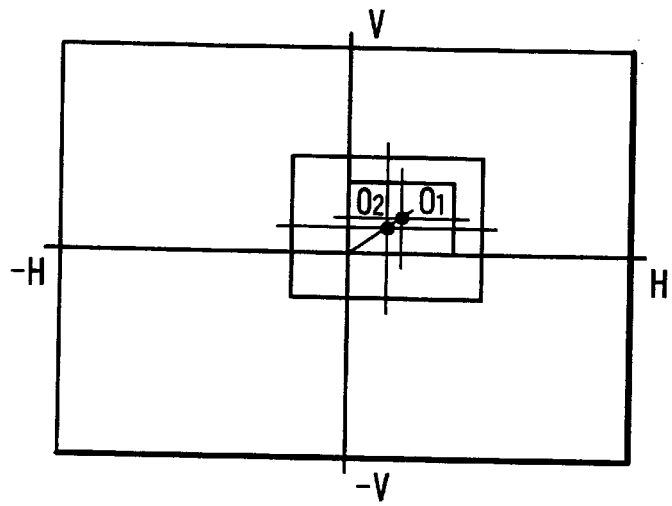
FIG. 8 is a view which shows the operation of a concrete example of the present invention.
Figure 9:
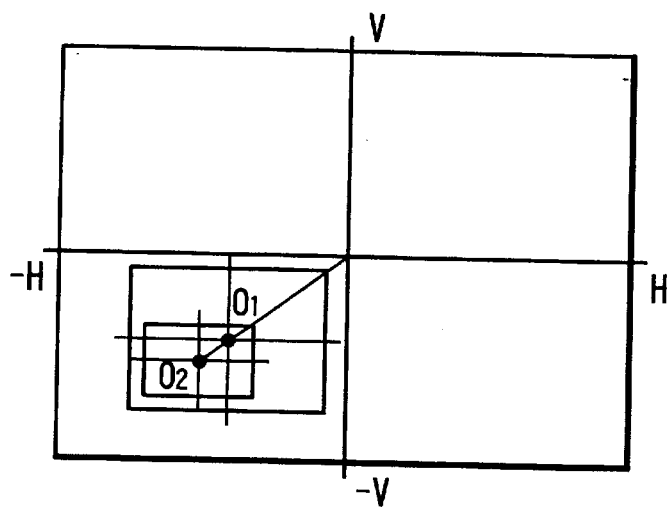
FIG. 9 is a view which shows the operation of a concrete example of the present invention.

The concrete examples of the operation of the present invention will be shown in FIGS. 6 through 9. FIG. 6 shows an example of a magnified slave picture screen at the peripheral portion of the display screen. FIG. 7 shows an example of a reduced slave picture screen at the peripheral portion of the display screen. FIG. 8 shows an example of a magnified slave picture screen at the central portion of the display screen. FIG. 9 shows an example of a reduced slave picture screen at the central portion of the display screen.

In this device, it is assumed that a picture screen before being subjected to magnification or reduction is the first picture screen and that a picture screen after being subjected to magnification or reduction is the second picture screen. Then, the center of the second picture screen is moved and the second picture screen is magnified or reduced so that the ratio of the distance between the center of the display screen and that of the first picture screen to the distance between the center of the display screen and that of the second picture screen on a line passing the center of the first picture screen and that of the display screen is the same as the ratio of the distance between the center of the display screen and that of the first picture screen to the distance between the center of the display screen and that of the second picture screen when the first and second picture screens are moved to an arbitrary corner on the display screen. By doing so, the change of the display position due to the magnification/reduction of the picture screen is little and it is, therefore, possible to remove the possibility that a part of a picture screen is lost.

As a result, compared with the conventional device in which various problems might possibly occur such as, for example, if the picture screen display position can be arbitrarily changed, the display position is changed by the magnification/reduction of the picture screen to thereby make the display position of a picture screen appear unnatural or a part of the picture screen is lost, the present invention can easily solve the various problems.

This device should not be limited to the main and slave picture screens as described above. It can be applied to a case where a picture screen is simply reduced or magnified and then displayed, a case where an information screen (menu) analogous to the display screen is reduced/magnified or a case where arbitrary one of a plurality of picture screens displayed is reduced/magnified.

Thus, the above-described video equipment is capable of magnifying or reducing the first picture screen reduced to an arbitrary size from the size of the display screen and displayed at an arbitrary position at an arbitrary scale factor and displaying it as the second picture screen. The video equipment includes a means for setting the size of the second picture screen and a means for setting the display position of the second picture screen. In the equipment, the center of the second picture screen is moved and the second picture screen is magnified or reduced so that the ratio of the distance between the center of the display screen and that of the first picture screen to the distance between the center of the display screen and that of the second picture screen on a line passing the center of the first picture screen and that of the display screen is the same as the ratio of the distance between the center of the display screen and that of the first picture screen to the distance between the center of the display screen and that of the second picture screen when the first and second picture screens are moved to an arbitrary corner on the display screen. As a result, the change of the display position due to the magnification/reduction of the picture screen is little and it is, therefore, possible to remove the possibility that a part of the picture screen is lost due to the changed display position.

The present invention should not be limited to the above-described embodiment and various changes and modifications can be made so as not to depart from the spirit of the present invention.

According to the invention recited in claim 1, therefore, while it is assumed that a picture screen before being magnified or reduced is the first picture screen and a picture screen after being magnified or reduced is the second picture screen, the center of the second picture screen is moved and the second picture screen is either magnified or reduced so that the ratio of the distance between the center of the display screen and that of the first picture screen to the distance between the center of the display screen and that of the second picture screen on a line passing the center of the first picture screen and that of the display screen is the same as the ratio of the distance between the center of the display screen and that of the first picture screen to the distance between the center of the display screen and that of the second picture screen when the first and second picture screen are moved to an arbitrary corner on the display screen. As a result, the change of the display position due to the magnification/reduction of the picture screen is little and it is, therefore, possible to remove the possibility that a part of the picture screen is lost due to the changed display position.

By doing so, compared with the conventional device in which various problems might possibly occur such as, for example, if the picture screen display position can be changed, the display position is changed by the magnification/reduction of the picture screen to thereby make the display position appear unnatural or a part of the picture screen is lost, the present invention can easily solve the various problems.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A video equipment capable of magnifying or reducing arbitrarily a first picture screen of an arbitrary size reduced from a size of a display screen and displayed at an arbitrary position and displaying a resultant first picture screen as a second picture screen on the display screen, said video equipment being characterized by comprising:

a means for setting a size of said second picture screen; and a means for setting a display position of said second picture screen, and in that a center of the second picture screen is moved and the second picture screen is magnified or reduced so that a ratio of a distance between a center of the display screen and that of the first picture screen to a distance between the center of the display screen and that of the second picture screen on a line passing the center of the first picture screen and that of the display screen is the same as a ratio of a distance between the center of the display screen and that of the first picture screen to a distance between the center of the display screen and that of the second picture screen when the first and second picture screens are moved to an arbitrary corner on the display screen.

2. A video equipment according to claim 1, characterized in that said first and second picture screens are a slave picture screen displayed together with a main picture screen of the same size as that of said display screen.

3. A video equipment according to claim 1, characterized in that said first and second picture screens are an information picture screen displayed together with a main picture screen of the same size as that of said display screen.

4. A video equipment according to claim 1, characterized in that said first and second picture screens are each an arbitrary one picture screen of a plurality of picture screens displayed altogether.

* * * * *